Apr. 17, 1923.
J. NOVAK
HOT AIR CONDUIT
Filed Aug. 10, 1920
1,451,887
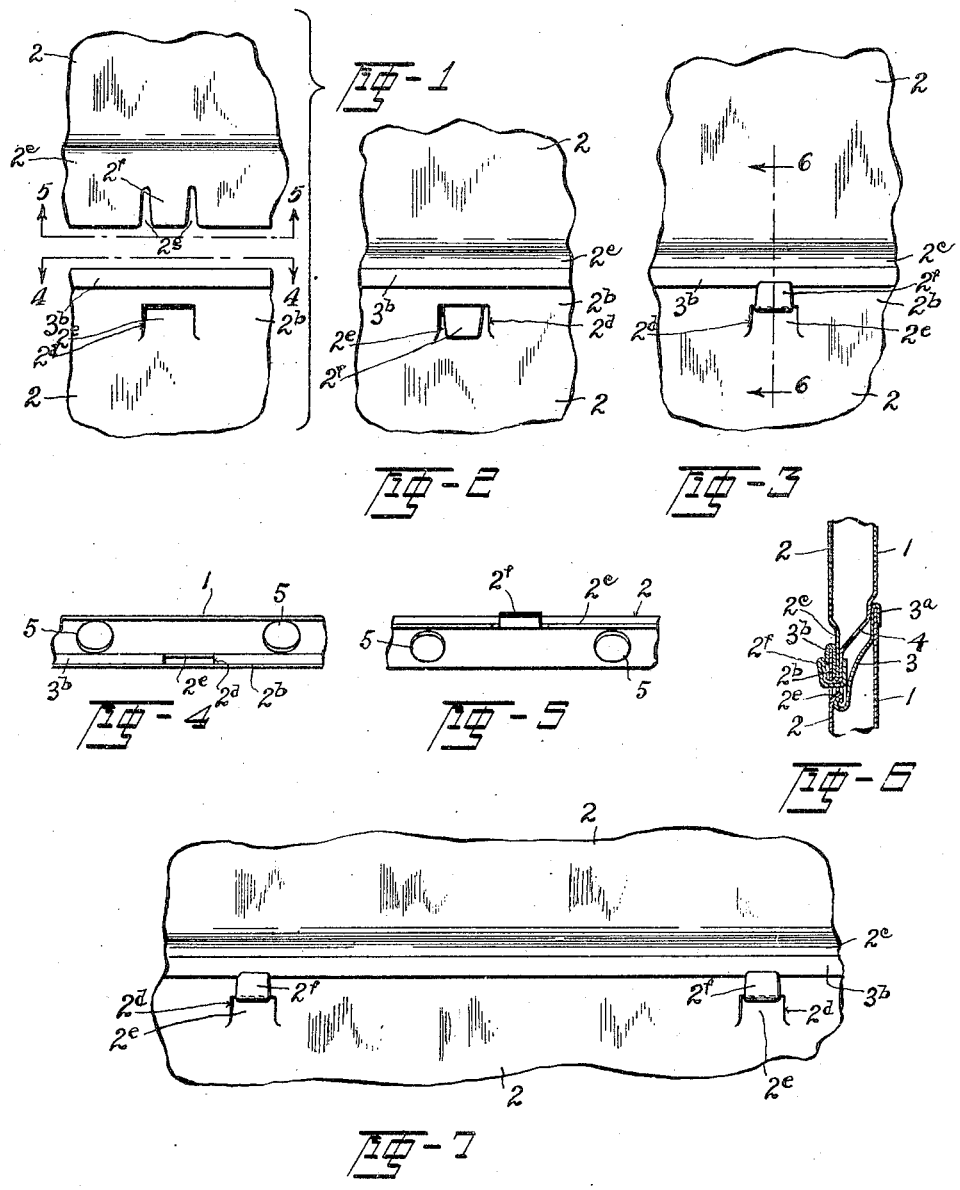
Inventor
Joseph Novak
By Fred C. Billman
Attorney Patented Apr. 17, 1923.

1,451,887

UNITED STATES PATENT OFFICE.

JOSEPH NOVAK, OF CLEVELAND, OHIO, ASSIGNOR TO THE HENRY FURNACE AND FOUNDRY COMPANY, OF CLEVELAND, OHIO.

HOT-AIR CONDUIT.

Application filed August 10, 1920. Serial No. 402,584.

*To all whom it may concern:*

Be it known that I, JOSEPH NOVAK, a citizen of the United States, residing at Cleveland, in the county of Cuyahoga and State of Ohio, have invented certain new and useful Improvements in Hot-Air Conduits, of which the following is a specification.

This invention relates to improvements in hot air conduits, the present invention relating more particularly to that class or type of conduits which are particularly designed and adapted for use in connection with hot air furnaces above the first floor line in conducting and distributing hot air to the various rooms to be heated, the improved conduit being adapted to be arranged or disposed within the side walls of the various rooms or compartments of the building.

The present improvements relate particularly to improved coupling means for conduit sections for connecting and locking the adjacent or jointed ends of the conduit sections or units whereby when said conduit sections are assembled and connected together the same will be securely retained and locked in position to prevent the accidental loosening or opening of the joint.

The primary object of the invention is to provide a generally improved coupling or lock of this class which will be exceedingly simple in construction, cheap of manufacture, and efficient in use.

With the above mentioned and other ends in view, my invention consists in the novel construction, arrangement, and combination of parts, hereinafter described, illustrated in one of its embodiments in the accompanying drawings, and particularly pointed out in the appended claims.

Referring to the drawings forming a part of this specification, Figure 1 is a fragmentary disassembled view of the upper and lower marginal edges of two conduit sections embodying the improved coupling tongue and recess members preparatory to being assembled or coupled together.

Fig. 2, a view of the same in assembled or nested position preparatory to being locked by the coupling tongue members.

Fig. 3, a view of the same in assembled locked position.

Fig. 4, a fragmentary top edge view of one of the conduit sections taken on line 4—4 of Fig. 1 and illustrating in particular the coupling recess member for receiving the tongue coupling member.

Fig. 5, a similar view of the lower marginal edge of a conduit section equipped with the coupling tongue member and taken substantially on line 5—5 of Fig. 1.

Fig. 6, a sectional view of the coupled and locked conduit sections taken on line 6—6 of Fig. 3.

Fig. 7, a view of a pair of assembled and locked conduit sections equipped with a pair of coupling members in locked position.

Similar numerals of reference designate like parts thruout all the figures of the drawings.

The conduit unit or section comprises the usual inner and outer walls 1 and 2, respectively, connected to and spaced from each other, in the present instance, by means of upper and lower wall spacing members 3 and 4, respectively. In the present instance, the upper wall spacing member 3, is formed of a separate piece terminating in wall receiving flanges $3^a$ and $3^b$, taking over and receiving the upper marginal edges of the outer wall 2, and inner wall 1, respectively. It will be seen that the front marginal edge of the upper wall spacing member 3, forms a double walled overlapping marginal portion $2^b$, receiving the underlapping lower marginal portion $2^c$, of a superposed conduit section. said underlapping lower marginal portion $2^c$, being slightly inset as will appear on reference to Fig. 6 of the drawings. The wall spacing members 3 and 4, are provided with the usual air openings or ports 5, for the circulation of air within the air insulating space between the inner and outer walls.

Referring now to the improved coupling and locking members to which this invention particularly relates, it will be seen that the overlapping marginal portion $2^b$, is provided with a struck out recess or opening $2^d$, formed by an upwardly and inwardly extending guide $2^e$.

The lower underlapping marginal portion $2^c$, is provided with tongues $2^f$, formed by means of a pair of notched recesses or slots $2^g$.

The slits or recesses $2^g$, extend substantially parallel with each other, and the tongues may be inclined slightly outwardly as indicated in Fig. 5 of the drawings.

The struck out tongue and recess coupling members may be arranged at suitable intervals on opposite marginal edges or sides of the conduit sections, but under ordinary circumstances where the conduit is of ordinary width a single set of coupling members on the front and rear sides will be sufficient, but if desired a pair of such coupling devices may be used on the front and rear sides as indicated in Fig. 7 of the drawings.

In the act of building up or nesting the conduit sections, it will be apparent that as a superposed section is placed in position as indicated in Fig. 2 of the drawings the inwardly and upwardly extending guides 2$^e$, will engage the free ends of the depending tongues 2$^f$, and as the section is pressed downwardly the tongues will be directed outwardly, and after the section is fully seated it may be locked in position by turning the tongues up as shown in Figs. 3, 6 and 7 of the drawings.

Having thus described one of the embodiments of the invention, what I claim and desire to secure by Letters Patent, is,—

1. In a coupling for conduit sections, a conduit section having its under and overlapping marginal edges provided with struck out tongue and recess members, respectively, to receive and interlock with similar members of adjacent conduit sections, said recess members being provided with inner tongue guides.

2. A coupling for conduit sections, comprising a conduit section having its overlapping marginal edges provided with struck out tongue and recess members, said recess members having inwardly struck upwardly extending tongue receiving guides and said tongue members being arranged within the vertical planes of said guides to enter and be guided by the latter in assembling and being cut from the underlapping marginal edge.

3. A coupling for conduit sections, comprising a conduit section having its under and overlapping marginal edges provided with struck out tongue and recess members, respectively, said recess members having tongue receiving guides spaced from the edge of the overlapping member, and said tongue members being arranged to engage and be directed outwardly by said guides and being cut from the lower edges of said underlapping marginal edge and turned up to lock the sections in position.

4. In a hot air conduit, a conduit section having its lower and upper marginal edges provided with tongue and recess members, respectively, said tongue members being each formed by a pair of slits cut from the lower marginal edge thereof, and said recess members being formed by inwardly struck upwardly extending guides struck from the upper marginal edges thereof and spaced below the same to receive and direct the free ends of said tongues outwardly into said recess members when assembling.

5. In a hot air conduit, a conduit section having its under and overlapping marginal edges provided with tongue and recess members, respectively, said tongue members being each formed by slits cut from the underlapping marginal edge thereof, and said recess members being formed by upwardly extending tongue guides struck from the overlapping marginal edges thereof and spaced below the same to receive and direct the upturned free ends of said tongues outwardly into said recesses whereby the latter may be turned over for locking the sections in assembled position.

In testimony whereof I have affixed my signature.

JOSEPH NOVAK.